(12) United States Patent
Noda

(10) Patent No.: US 7,948,144 B2
(45) Date of Patent: May 24, 2011

(54) ELECTRICAL ROTARY MACHINE

(75) Inventor: Tatsuya Noda, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 68 days.

(21) Appl. No.: 11/992,406

(22) PCT Filed: Aug. 9, 2006

(86) PCT No.: PCT/JP2006/315759
§ 371 (c)(1),
(2), (4) Date: May 22, 2008

(87) PCT Pub. No.: WO2007/034633
PCT Pub. Date: Mar. 29, 2007

(65) Prior Publication Data
US 2008/0303371 A1 Dec. 11, 2008

(30) Foreign Application Priority Data

Sep. 22, 2005 (JP) ................... 2005-274968

(51) Int. Cl.
*H02K 1/00* (2006.01)
*H02K 47/00* (2006.01)
*H02K 16/00* (2006.01)
*H02K 23/60* (2006.01)
*H02K 1/06* (2006.01)

(52) U.S. Cl. .............. 310/216.001; 310/113; 310/114; 310/115; 310/216.007; 310/216.008; 310/216.009; 310/191; 310/209

(58) Field of Classification Search .......... 310/216, 310/113–115, 216.001, 216.007–216.009, 310/191, 209
See application file for complete search history.

(56) References Cited

U.S. PATENT DOCUMENTS

| | | | |
|---|---|---|---|
| 5,668,427 A | 9/1997 | Morita | |
| 5,798,583 A | 8/1998 | Morita | |
| 5,930,076 A | 7/1999 | Morita | |
| 6,188,159 B1 | 2/2001 | Fan | |
| 6,320,487 B1 * | 11/2001 | Miller et al. | 335/274 |
| 6,810,066 B2 | 10/2004 | Baney et al. | |
| 7,550,883 B2 * | 6/2009 | Tamaoka et al. | 310/67 R |
| 2004/0245878 A1 * | 12/2004 | Kim et al. | 310/114 |

(Continued)

FOREIGN PATENT DOCUMENTS

JP   64-030644 U   2/1989

(Continued)

OTHER PUBLICATIONS

Machine Translation JP2004320824A (2004).*

(Continued)

*Primary Examiner* — Quyen Leung
*Assistant Examiner* — Jose A Gonzalez Quinones
(74) *Attorney, Agent, or Firm* — Squire, Sanders & Dempsey (US) LLP

(57) ABSTRACT

An electric motor 1 comprises a rotator 20 rotating relative to a stator 10 and a plurality of teeth 11 winding an exciting coil 12 in the stator 10. The teeth 11 generate a magnetic field directed to the rotator 20 from tip faces 11a and comprise a radially extending part 11A extending in a radial direction of the rotator 20 and a coil winding part 11B formed to be bent from the radially extending part 11A.

16 Claims, 15 Drawing Sheets

U.S. PATENT DOCUMENTS

| | | | |
|---|---|---|---|
| 2006/0197402 A1 * | 9/2006 | Gomyo et al. | 310/216 |
| 2007/0096587 A1 * | 5/2007 | Ionel et al. | 310/218 |

FOREIGN PATENT DOCUMENTS

| | | |
|---|---|---|
| JP | 123327/1097 | 2/1989 |
| JP | 2-131340 | 5/1990 |
| JP | 3-98445 | 4/1991 |
| JP | 2000-50540 | 2/2000 |
| JP | 2000-166131 | 6/2000 |
| JP | 2003-70191 | 3/2003 |
| JP | 2003070191 A * | 3/2003 |
| JP | 2003-37968 | 9/2003 |
| JP | 2004-159476 | 3/2004 |
| JP | 2004-173390 A | 6/2004 |
| JP | 2004320824 A * | 11/2004 |
| JP | 2005-237191 A | 9/2005 |
| WO | 2004/006412 A2 | 1/2004 |

OTHER PUBLICATIONS

Machine Translation JP2003070191 (2003).*

Japanese Office Action, Japanese Patent Application No. 2005-274968, Drafting Date: Nov. 2, 2010, Mailing Date: Nov. 9, 2010, pp. 1-4.

Japanese Office Action, Japanese Patent Application No. 2005-274968, Date: Mar. 2, 2011, pp. 1-3.

* cited by examiner

ELECTRICAL ROTARY MACHINE

TECHNICAL FIELD

The present invention relates to an electrical rotary machine including a rotator rotating relative to a stator.

BACKGROUND ART

In general, an electric motor (electrical rotary machine) which includes a substantially cylindrical stator fixed to a housing and a rotator rotating by rotating a magnetic field generated by the stator is known. As for a structure of the stator of the electric motor, as disclosed in JP2004-159476A (paragraph 0007, FIG. 1, 2) and JP2003-37968A (paragraph 0027, FIG. 1, 2), conventionally, the structure which includes a plurality of approximately linear teeth arranged in the periphery of the rotator and extends in a radial direction, and an exciting coil wound around each tooth is known.

However, in the structure of a conventional stator, when the number of turns of the exciting coil is increased in order to obtain larger motor torque, there is a problem that the size of the teeth needs to be extended in a radial direction and the electric motor becomes larger in size in a radial direction.

The present invention aims to provide an electrical rotary machine wherein the number of turns of an exciting coil can be increased without enlarging the machine in a radial direction.

DISCLOSURE OF THE INVENTION

In order to solve the problems mentioned above, the present invention is characterized in that the electrical rotary machine includes a rotator rotating relative to a stator, wherein at least one of the rotator and the stator includes a plurality of teeth winding exciting coils, the teeth which generates a magnetic field from tip faces of the teeth to the stator or the rotator. The teeth is characterized in that the teeth comprises a radially extending part extending in a radial direction of the rotator and a coil winding part formed to be bent from the radially extending part.

According to the present invention, the coil winding part to extend in an axial direction without increasing the size of the part in a radial direction since the coil winding part is formed to be bent from the radially extending part extending in a radial direction of the stator, comparing conventional teeth, wherein a radially extending part and a coil winding part are placed straight in a radial direction of the rotator. Accordingly, the number of turns of an exciting coil can be increased without enlarging the electrical rotary machine in a radial direction. In addition, as mentioned above, when the coil winding part extends in a radial direction, the volume of the whole electrical rotary machine of the present invention is not so different from that of the conventional rotary machine. However, a speed reducer can be installed in a space surrounded by coil winding parts extending in an axial direction, or the like, which can make an optimal design possible.

In the electrical rotary machine mentioned above, the coil winding part may be extended in an axial direction of the rotator.

In the electrical rotary machine, wherein the coil winding part extends in an axial direction of the rotator, a size of a gap (slot) between adjacent coil winding parts is approximately uniform when a length of the coil winding part is extended in an axial direction in order to increase the number of turns of the exciting coil. Consequently, a better value of space factor (a ratio of a cross section of the exciting coil to a cross section of the slot) can be maintained. Incidentally, in the conventional teeth extending in a radial direction, when a length of the coil winding part is extended in a radial direction in order to increase the number of turns of the exciting coil, a gap between adjacent coil winding parts is outwardly extended in a radial direction. Accordingly, a space factor becomes low. The present invention successfully prevents the space factor from going down.

The electrical rotary machine mentioned above may be comprised of: at least, the stator which includes the plurality of teeth; the rotator which includes a magnetic field generating means for generating a magnetic field directed to the stator, wherein tip faces of the teeth of the stator are formed to have a larger area than that of opposing faces of the magnetic field generating means of the rotator, the opposing faces opposite to the stator.

Hereinafter, the magnetic field generating means includes a permanent magnet, an electromagnet or the like (teeth or exciting coils) which generates a magnetic field.

According to the electrical rotary machine, a large amount of magnetic flux from the magnetic field generating means can be captured by the teeth of the stator since the tip faces of the teeth of the stator are formed to have a larger area than that of the opposing faces of the magnetic field generating means of the rotator, the opposing faces opposite to the stator.

The electrical rotary machine mentioned above may as well install a magnetic flux capture projection to capture magnetic flux which is generated by the magnetic field generating means of the rotator and extends in an axial direction of the rotator, the projection on the tip side of the teeth of the stator.

According to the electrical rotary machine, since magnetic flux which is generated by the magnetic field generating means of the rotator and proceeds in an axial direction of the rotator is captured by the magnetic flux capture projection installed at a tip of the teeth of the stator, a large amount of magnetic flux which is generated by the magnetic field generating means and proceeds in an axial direction can be captured.

The electrical rotary machine mentioned above may as well comprise a coil positioning projection to adjust a winding range of the exciting coil in the coil winding part.

In the electrical rotary machine, the coil positioning projection which limits a winding range of the exciting coil in the coil winding part becomes a mark as a start point and an end point in winding the exciting coil when the exciting coil is wound on the coil winding part and helps to hold the exciting coil firmly in the coil winding part. Accordingly, the exciting coil can be wound in order in the coil winding part and a high space factor can be achieved.

The electrical rotary machine mentioned above may as well comprise a connecting member to connect base end parts of the plurality of teeth which are arranged in a circle.

According to the electrical rotary machine, since the base end parts of the plurality of teeth arranged in a circle are connected with the connecting members, magnetic flux can move between adjacent teeth, a stable magnetic path can be formed.

In the electrical rotary machine mentioned above, corners formed in connected sections between the base end parts and the connecting member may be formed in a curved face shape.

According to the electrical rotary machine, since the corners formed in connected section between the base end part of the teeth and the connecting member are formed in a curved face shape, magnetic flux can easily be passed, and a stable magnetic path can be formed.

According to the electrical rotary machine, the teeth may be constructed to be divided into first teeth and second teeth, the first teeth including at least a tip face of the radially extending part, the second teeth including the coil winding part, wherein the first and second teeth may be freely connected to each other.

In the electrical rotary machine, as the teeth are divided into the first teeth and second teeth which are freely connected with one another, the teeth need not to be processed as a whole, and the first and second teeth which are smaller than the whole teeth can be individually processed. Consequently, the teeth can be easily processed and cost reduction can be realized.

In the electrical rotary machine mentioned above, the connecting part between the first teeth and the second teeth may as well comprise a form of a plurality of concave and convex parts which engage with one another.

According to the electrical rotary machine, as the connecting parts of the first teeth and the second teeth are formed to have the plurality of concave and convex parts which engage with one another, the connecting parts can be securely maintained in a fixed position even if the stator vibrates due to a reactive force resulting from a magnetic influence of the rotator which rotates.

The electrical rotary machine mentioned above may as well install a teeth positioning projection which helps to set the axis of the plurality of teeth as a whole by engaging the first teeth with a part of the motor case.

According to the electrical rotary machine, an accuracy in setting the plurality of teeth arranged in a circle on the axis of the motor case can be improved thanks to the teeth positioning projection which sets where to engage the first teeth with the part of the motor case.

In the electrical rotary machine mentioned above, the teeth may be constructed by laminating a plurality of steel plates.

According to the electrical rotary machine, as the teeth can easily be manufactured only by laminating steel plates of several shapes which are formed by punching out a predetermined shape in steel plates, the manufacturing costs or material costs can be reduced.

In addition, as compared with a general core integrally formed by sintering granular powder, the teeth (core) which are manufactured by laminating the plurality of steel plates have a higher magnetic permeability and allow a reduction in size and achieve a high motor torque.

Further, the electrical rotary machine mentioned above may as well install a speed reducer which is on an axis of rotation of the rotator, the speed reducer installed in a space surrounded by the coil winding parts formed to be bent from the radially extending part.

According to the electrical rotary machine, as the electrical rotary machine has a structure that the speed reducer is installed in a space surrounded by the coil winding parts formed to be bent from the radially extending part, the electrical rotary machine can make an effective use of the space formed (space surrounded by the coil winding parts) to prevent the size of the electrical rotary machine from extending in a radial direction. Moreover, in the electrical rotary machine, since the electrical rotary machine has a structure that the speed reducer is installed in a space surrounded by the coil winding parts, a function of deceasing a speed is added without increasing the size or thickness of the electrical rotary machine.

BEST MODE FOR CARRYING OUT THE INVENTION

First Embodiment

Next, a first embodiment of the present invention will be described in detail with reference to drawings as needed.

Figure 1:
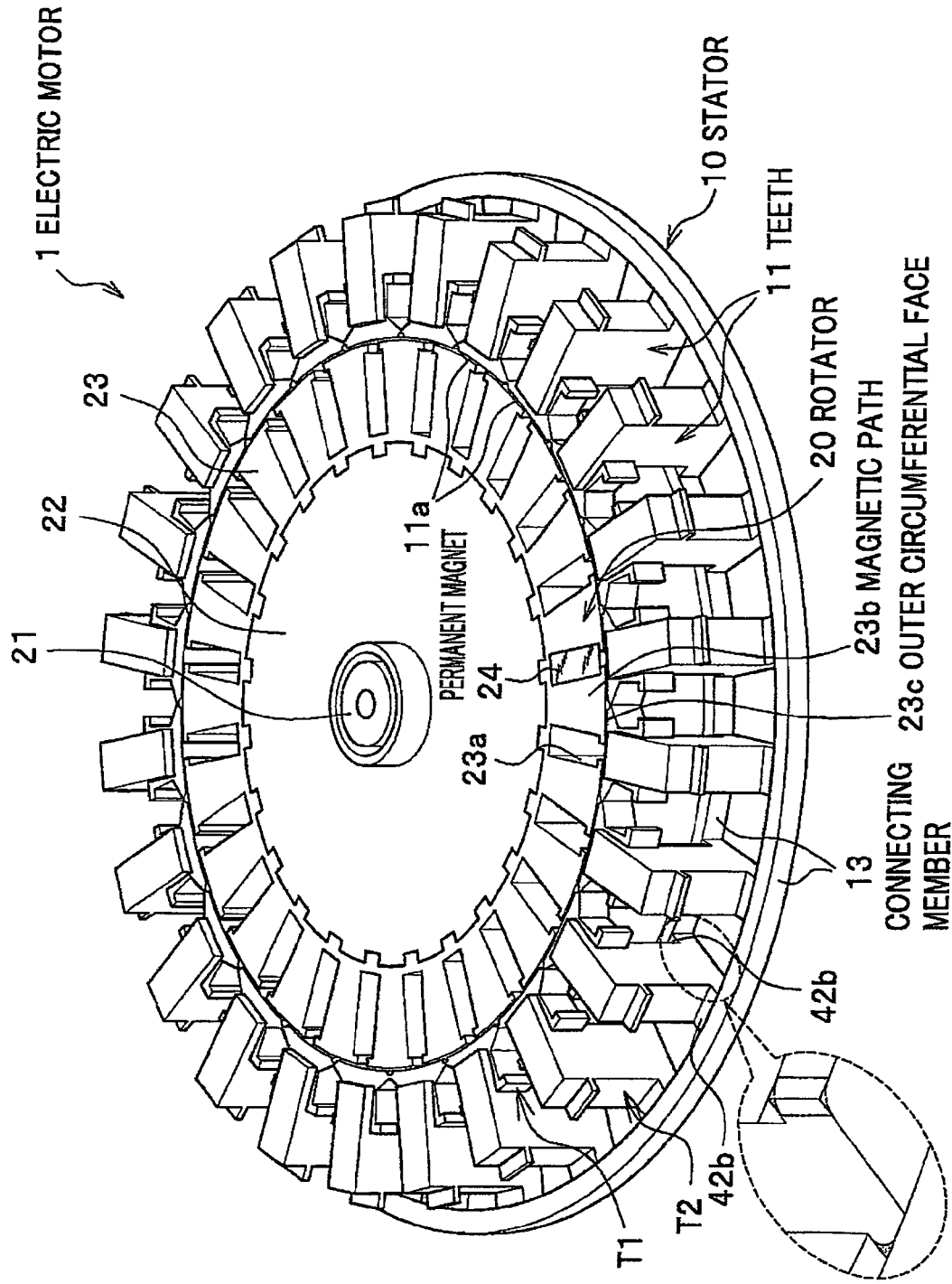
FIG. 1 is a schematic perspective view of a structure of an electric motor of a first embodiment.
Figure 2:
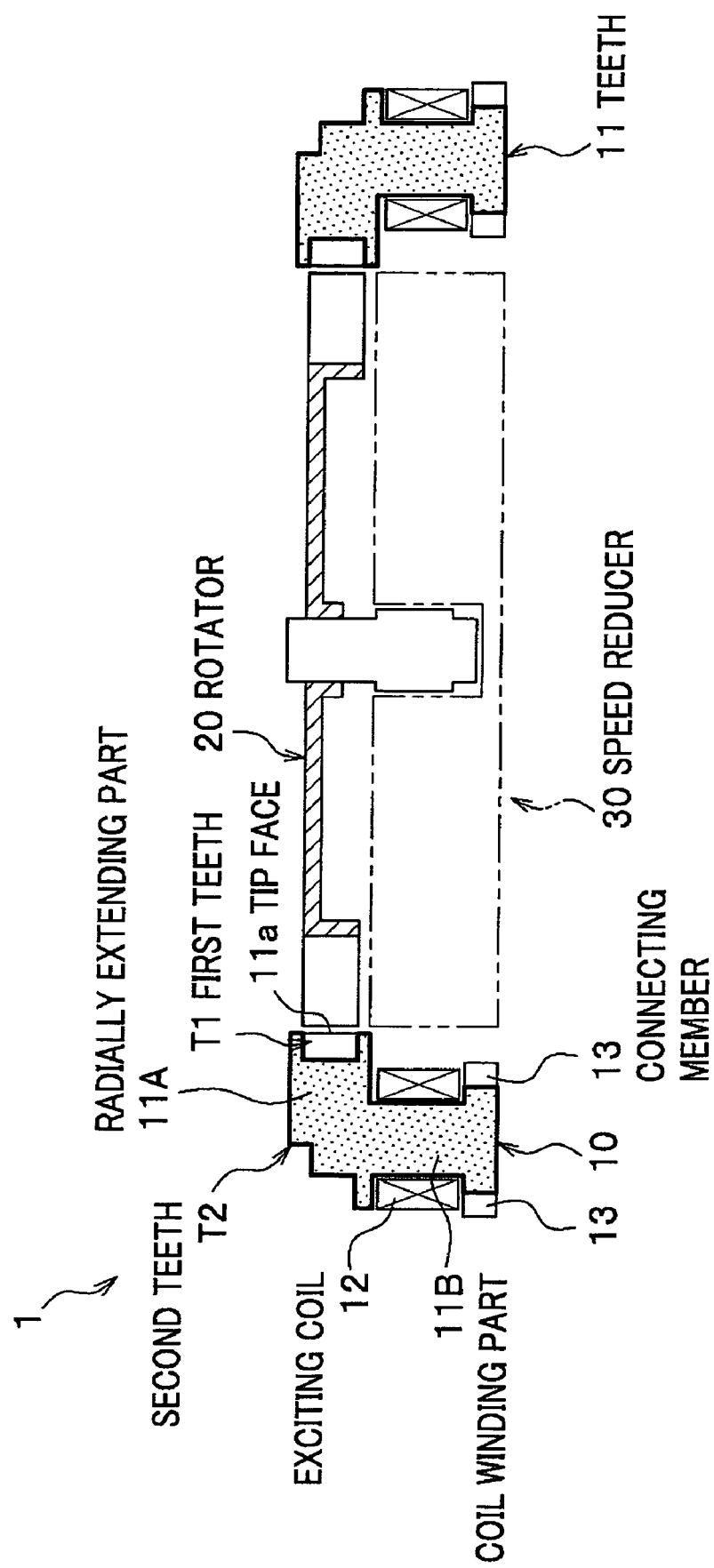
FIG. 2 is a schematic sectional view showing an internal structure of an electric motor.

As shown in FIG. 1 and FIG. 2, an electric motor 1 (electrical rotary machine) mainly comprises: a substantially cylindrical stator 10; a rotator 20 inserted in the stator 10; and a speed reducer 30 which is on an axis of rotation of the rotator 20. Subsequently, in the electric motor 1, rotating a magnetic field generated by the stator 10 rotates the rotator 20 relative to the stator 10, and the torque of rotator 20 is outwardly output via the speed reducer 30. The speed reducer 30 can adopt a widely known structure which includes a sun gear, planetary gear, carrier or the like as needed.

The stator 10 mainly comprises: a plurality of teeth 11; an exciting coil 12 winding the teeth 11; and a connecting member 13 connecting the plurality of teeth 11.

As shown in FIG. 2, the teeth 11 is formed in an approximate L-shape by connecting the radially extending part 11A extending in a radial direction of the rotator 20 with the coil winding part 11B extended in an axial direction of the rotator 20 and formed to be bent from the radially extending part 11A. Since the coil winding parts 11B is formed to be bent from the radially extending parts 11A, the coil winding parts 11B is arranged in a periphery of the speed reducer 30. Further, the teeth 11 has 1 divided structure in which a first teeth T1 is a section including a tip face 11a generating a magnetic field directed to the rotator 20 in the radially extending part 11A and a second teeth T2 is a rest of the radially extending part 11A.

Figure 3:
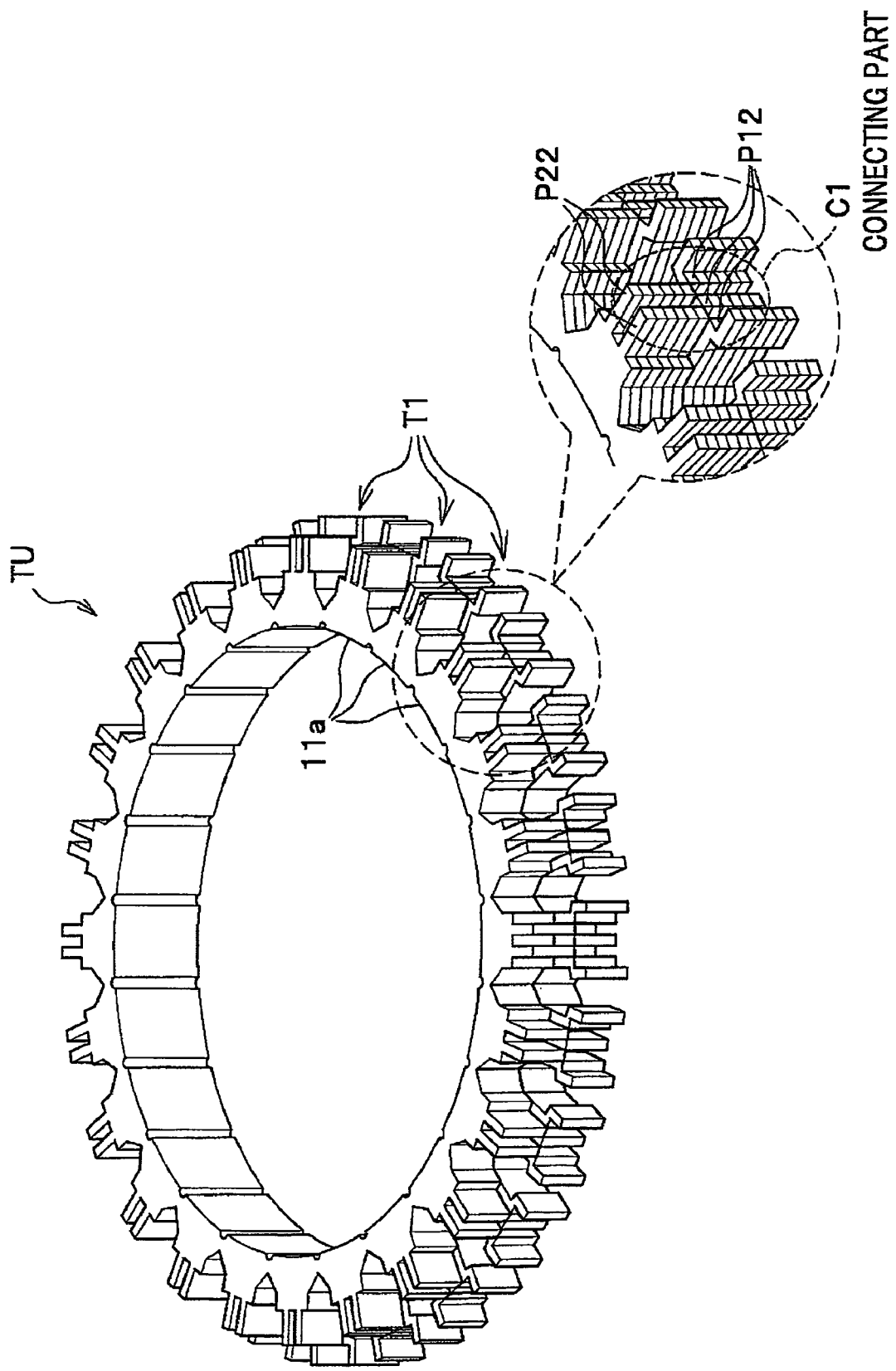
FIG. 3 is a perspective view of first teeth.
Figure 4:
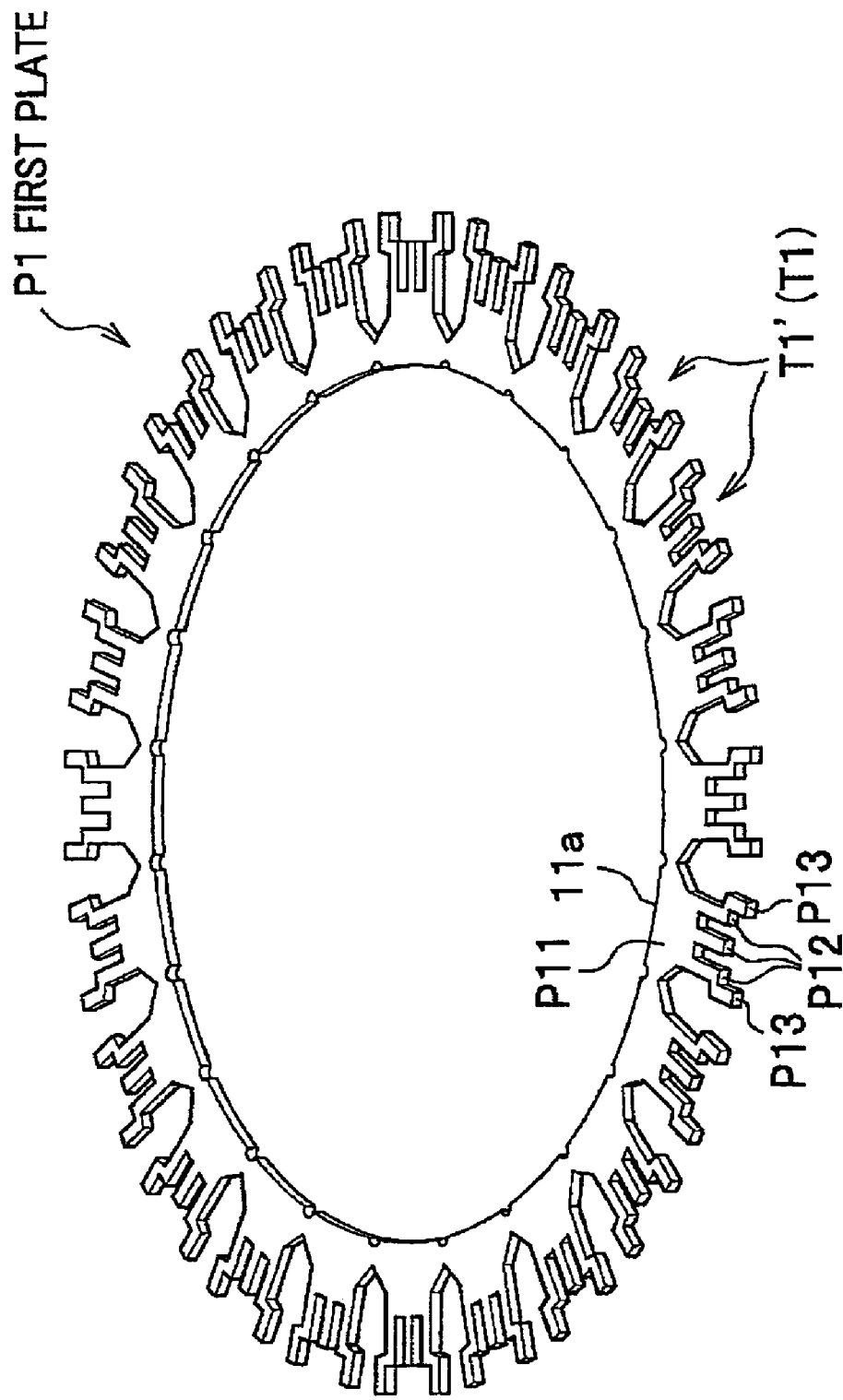
FIG. 4 is a perspective view of a first plate including the first teeth.
Figure 5:
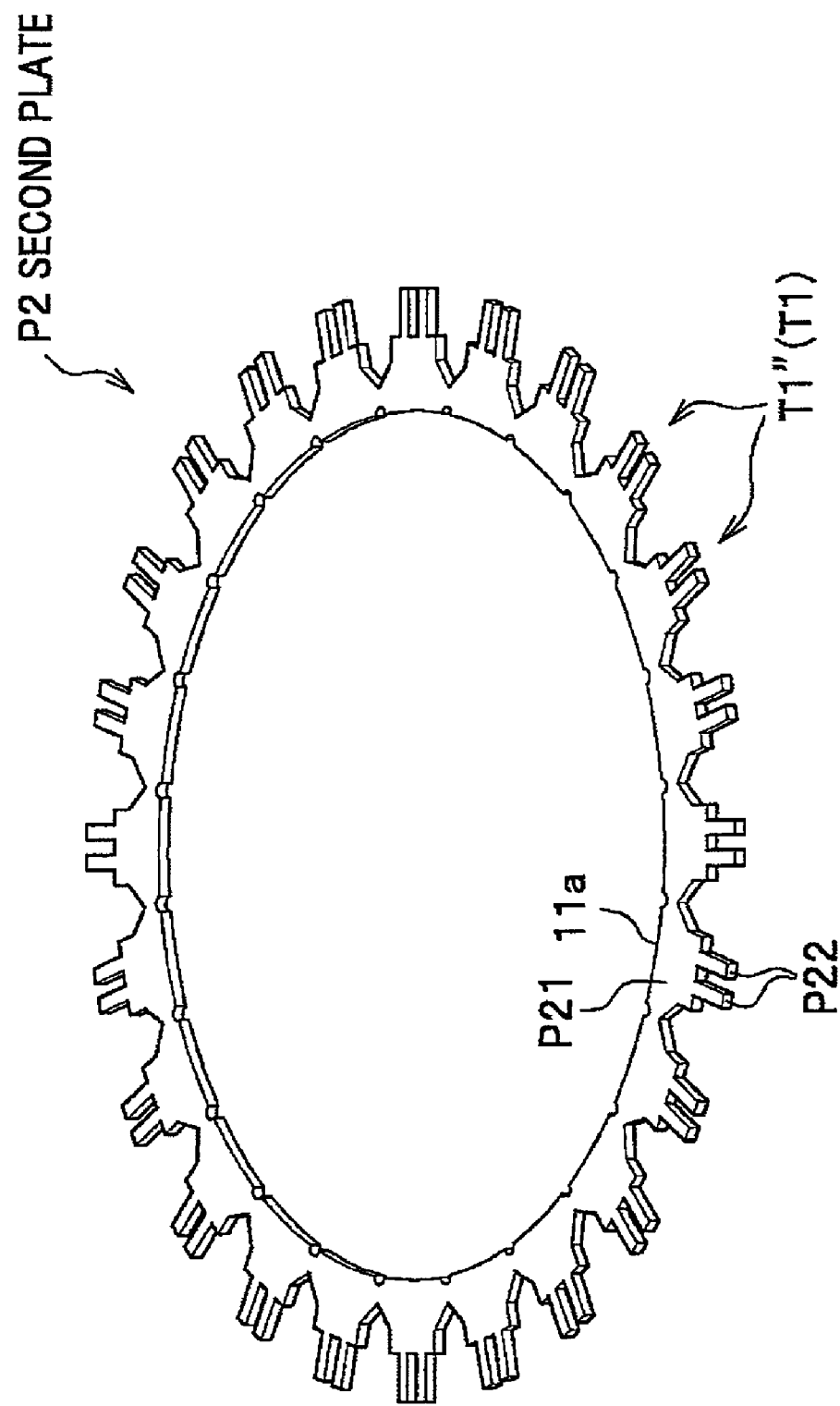
FIG. 5 is a perspective view of a second plate including the first teeth.

As shown in FIG. 3, in the plurality of first teeth T1, each tip faces 11a is arranged in a circle and directed to the inner circumferential side. A first teeth unit TU is integrally formed by connecting the vicinity of the tip faces 11a. As shown in FIGS. 4 and 5, the first teeth unit TU is formed by laminating two types of steel plates, that is, a first plate P1 and a second plate P2.

As shown in FIG. 4, the first plate P1 is comprised of teeth corresponding parts T1' corresponding to a part of the first teeth T1, the teeth corresponding parts T1' connected in a circle. The teeth corresponding parts T1' comprises: a tip end part P11 including the tip face 11a; three leg parts P12 extending from the tip end part P11 in a radial outward direction; two contact parts P13 (positioning projection) extending away from each other from the two outside leg parts P12 out of three leg parts P12 and extending in a radial outward direction.

As shown in FIG. 5, the second plate P2, like the first plate P1, is comprised of teeth corresponding parts T" corresponding to a part of the first teeth T1, the teeth corresponding parts T" connected in a circle. The teeth corresponding parts T" comprises: a tip end part P21 including the tip face 11a; and two leg parts P22 extending from the tip end P21 in a radial outward direction. Incidentally, the two leg parts P22 are formed to engage with channels formed by three leg parts of the first plate P1 (refer to FIG. 3 and FIG. 4.).

As shown in an enlarged view of FIG. 3, a part of a radial outward side of the first teeth T1 is comb-shaped as a connecting part C1 (a form of a plurality of concave and convex parts, in other words, the leg part P12 and P22 are arranged in a zigzag state) by laminating a predetermined number of the first plates P1 mentioned above on which a predetermined number of the second plates P2 are laminated.

Figure 6:
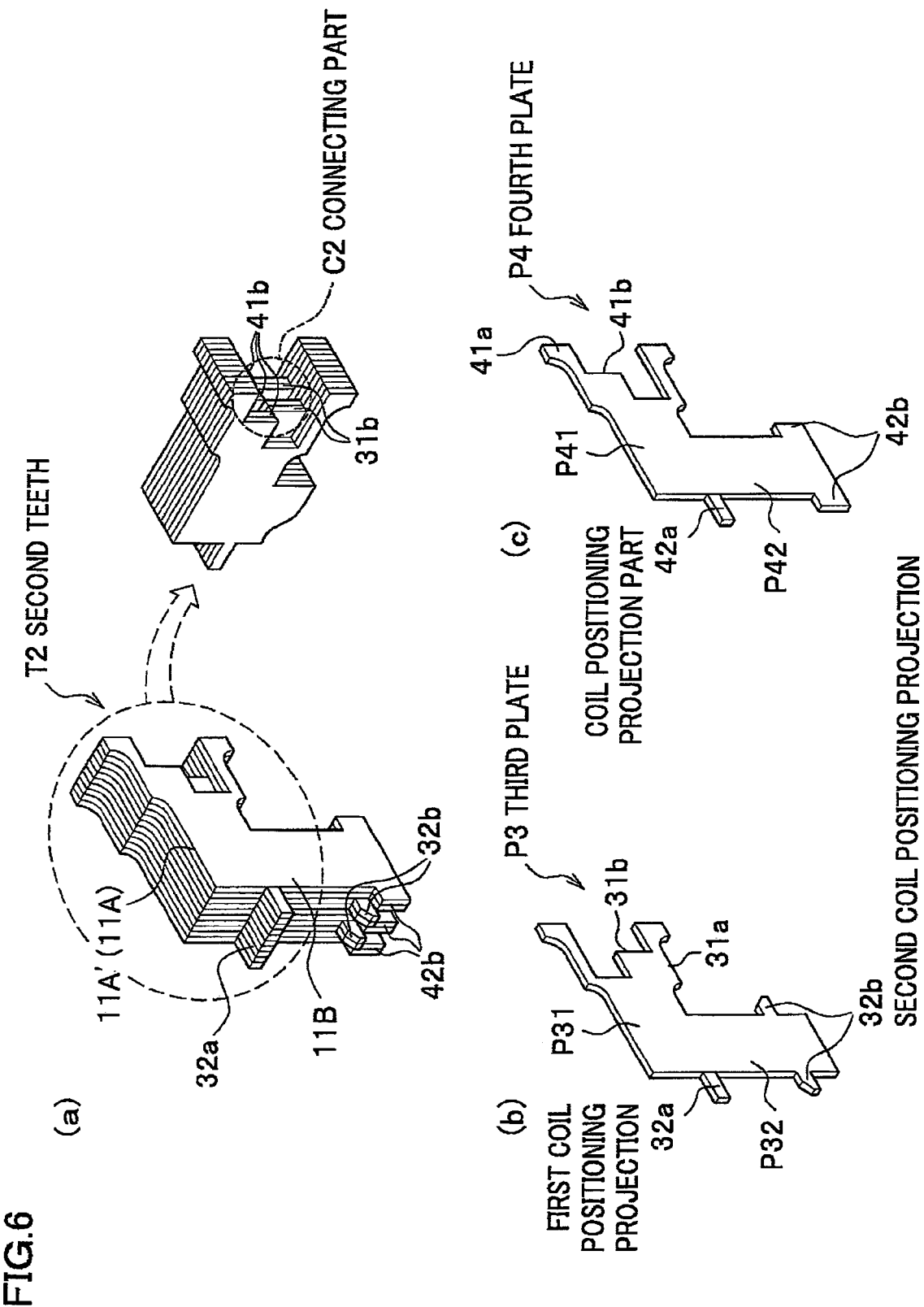
FIG. 6 includes a perspective view 6(a) of second teeth, a perspective view 6(b) of a third plate including the second teeth, and a perspective view 6(c) of a fourth plate including the second teeth.

As shown in FIG. 6(a), the second teeth T2 is integrally formed in an approximately L-shape by connecting the coil winding part 11B with a base part 11A' which is a remainder of the radially extending part 11A exclusive of the first teeth T1. As shown in FIGS. 6(b) and 6(c), the second teeth T2 is comprised by laminating two types of steel plate, that is, a third plate P3 and a fourth plate P4. Hereinafter, the third plate P3 and the fourth plate P4 will be described. For convenience sake, an explanation will be described as the base part 11A' is on the top side of the second teeth T2 and the coil winding part 11B is on the bottom side.

As shown in FIG. 6(b), the third plate P3 is formed in an approximately L-shape with a base-part corresponding part P31 corresponding to a part of the base part 11A' and with a coil-winding-part corresponding part P32 corresponding to a part of the coil winding part 11B. A tip end part 31a of the base-part corresponding part P31 is widely formed. A tip edge of the tip end part 31a includes a cutout part 31b in which a top side is cut out into a step-shape, the top side cut out larger than a bottom side. The coil-winding-part corresponding part P32 forms a first coil positioning projection 32a at a proper place on the top side of the part P32 and two second coil positioning projection parts 32b at a proper place on the bottom side of the part P32. While a lower edge of the first coil positioning projection 32a is formed to meet with the lower edge of the base-part corresponding part P31 (narrow lower edge), there is a predetermined length between the second coil positioning projection 32b and the first coil positioning projection 32a, both of which are formed to be placed on a same vertical line. Therefore, for example, the lower edges of the first coil positioning projection 32a and the base-part corresponding part P31 determine a starting point in winding the exciting coil 12. The higher edges of the two second coil positioning projection parts 32b determine an end point in winding the exciting coil 12. Accordingly, a winding range of the exciting coil 12 can be limited. A top corner of the second coil positioning projection part 32b is obliquely beveled so that an oblique plane can lead the exciting coil 12 to the coil-winding-part corresponding part P32 (coil winding part 11B). Incidentally, as the exciting coil 12 winding the coil winding part 11B needs to be wound firmly with a high tension adding, the exciting coil 12 wound in the coil winding part 11B applies a predetermined force to the first and second coil positioning projections 32a and 32b. The first and second coil positioning projections 32a and 32b are formed with a hardness corresponding to the predetermined force exerted by the exciting coil 12.

As shown in FIG. 6C, the fourth plate P4 is approximately L-shaped with a base-part corresponding part P41 corresponding to a part of the base part 11A' and a coil-winding-part corresponding part P42 corresponding to a part of the coil winding part 11B. In the base-part corresponding part P41, a tip end part 41a or the like is formed in an approximately same shape as that of the base-part corresponding part P31 of the third plate P3 mentioned above. A stepwise shape of a stepped cutin part 41b is formed contrary to that of the cutout part 31b of the third plate P3. Specifically, a bottom side and a top side of the cutin part 41b differ in that the bottom side is more widely cut out than the top side. In the coil-winding-part corresponding part P42, a coil positioning projection part 42a which is similar to the coil positioning projection part 32a of the third plate P3 mentioned above is formed at a proper place on a top side of the part P42, and a connecting claw 42b connecting with the connecting member 13 on both edges of a bottom end part of the part P42 is formed.

As shown in FIG. 6(a), a tip of the base part 11A' is formed in a comb-shape as a connecting part C2 (a form of a plurality of concave and convex parts, specifically, the step-shaped cutin part P31b and P41b are arranged in a zigzag state) by arranging three pairs of fourth plate P4 mentioned above and alternately interposing two pairs of third plate P3 between the three pairs of fourth plate P4. In the coil winding part 11B, a first coil positioning projection 32a is formed on one side of the part 11B, while three pairs of connecting claws 42b and two pairs of second coil positioning projections 32b are symmetrically formed on both sides of the coil winding part 11B.

Figure 7:
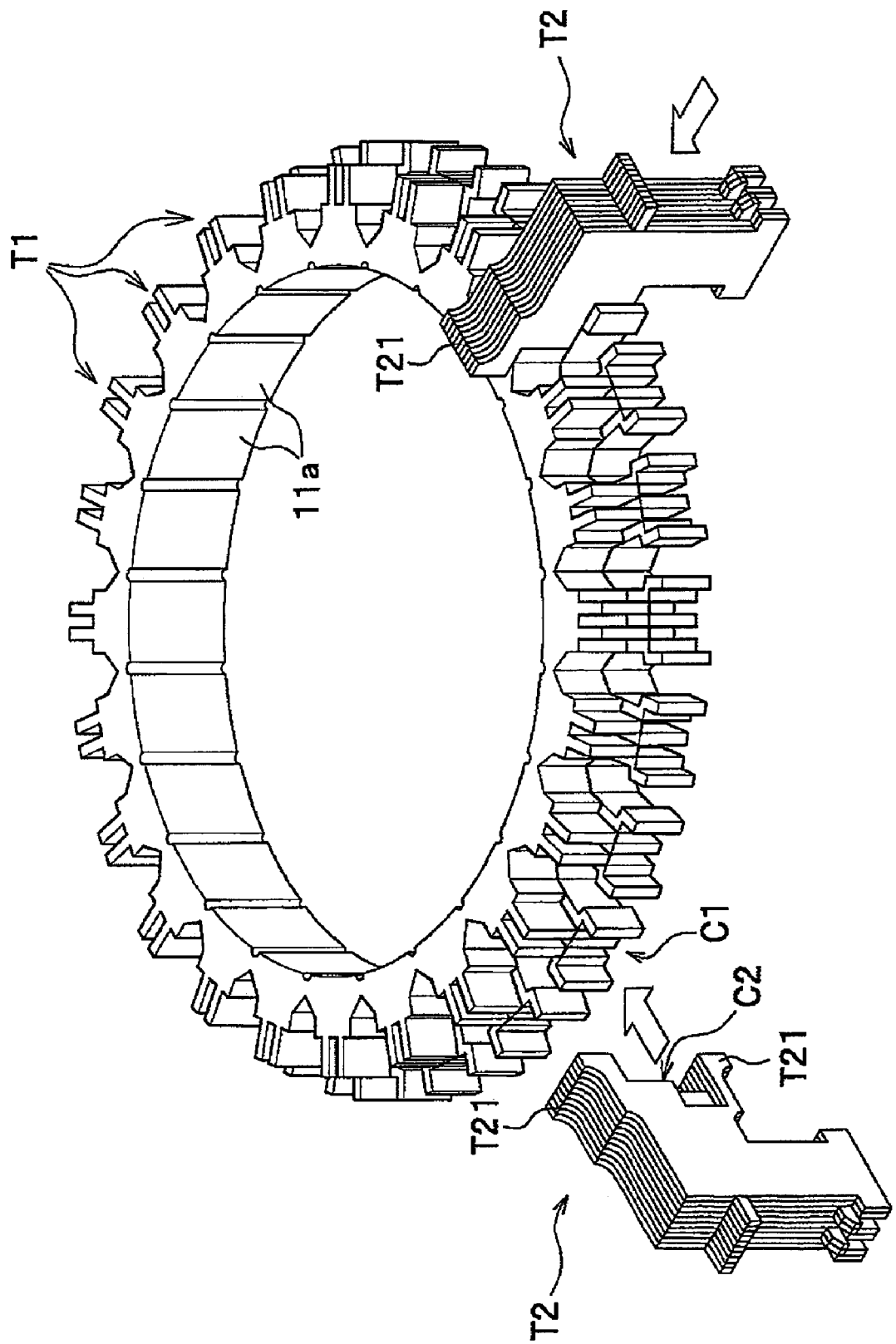
FIG. 7 is a perspective view showing a relation between the first teeth and the second teeth.

As shown in FIG. 7, the first teeth T1 and the second teeth T2 mentioned above are connected by engaging the connecting part C1 with the connecting part C2. In the embodiment of the present invention, the tip faces of the two projections T21 of the second teeth T2 which engages with the first teeth T1 are formed not to protrude from an inner face (each tip face 11a) of the first teeth T1. However, the present invention is not limited to this. Each projection T21 may be formed, whereof the tip face protrudes from an inner side of the first teeth T1. Accordingly, as each protruded projection T21 sets a rotor core 23 of the rotator 20 described later (refer to FIG. 1) in an axial direction of the rotator and includes a function of serving as a magnetic flux capture projection which has an effect of capturing magnetic flux which is generated from the rotor core 23 and proceeds in an axial direction of the rotator 20, it is preferable to construct the teeth as described above.

As shown in FIG. 1, the connecting member 13 is a ring-shaped member which connects the base end parts of the second teeth T2 with the first teeth T1 as described above. The connecting member 13 includes: a large diameter part connecting with the connecting claw 42b placed on a radial outward side of the second teeth T2; and a small diameter part connecting with the connecting claw 42b placed on a radial inward side of the second teeth T2. As shown in an enlarged view, it is preferable that corners formed in connected sections between the base end part of the second teeth T2 and the connecting member 13 are formed in a curved face shape. Accordingly, magnetic flux between each teeth 11 and the connecting member 13 can easily pass and a stable magnetic path can be formed.

The rotator 20 mainly comprises: a rotor boss 22 connected with a rotation shaft 21, a rotor core 23 fixed on the outer circumference of the rotor boss 22, and a permanent magnet 24 (magnetic field generating means, one unit is shown) held in a permanent magnetic holding hole 23a formed in the rotor core 23. In each permanent magnet 24, a magnetic pole is directed in a circumferential direction of the rotor core 23 and is arranged opposite to a magnetic pole with the same magnetic polarity. Accordingly, each magnetic path 23b (magnetic field generating means), which is formed between the permanent magnets 24, alternately generates a magnetic field of the north pole or south pole in a radial direction to the stator 10. An outer circumferential face 23c of a magnetic path 23b is formed, whereof an area is smaller than the tip face 11a of a tooth 11. Consequently, the tip face 11a of the tooth 11 always becomes larger in area than an opposing face of the magnetic path 23b opposite to the tip face (the opposing face except a gap between magnetic paths 23b). (When one tooth 11 faces two magnetic paths 23b, the opposing face is an overlap between the tip face 11a of the tooth 11 and the outer circumferential faces 23c of the two magnetic paths 23b.)

Finally, the relation between the stator 10 and the motor case 50 will be described.

Figure 8:
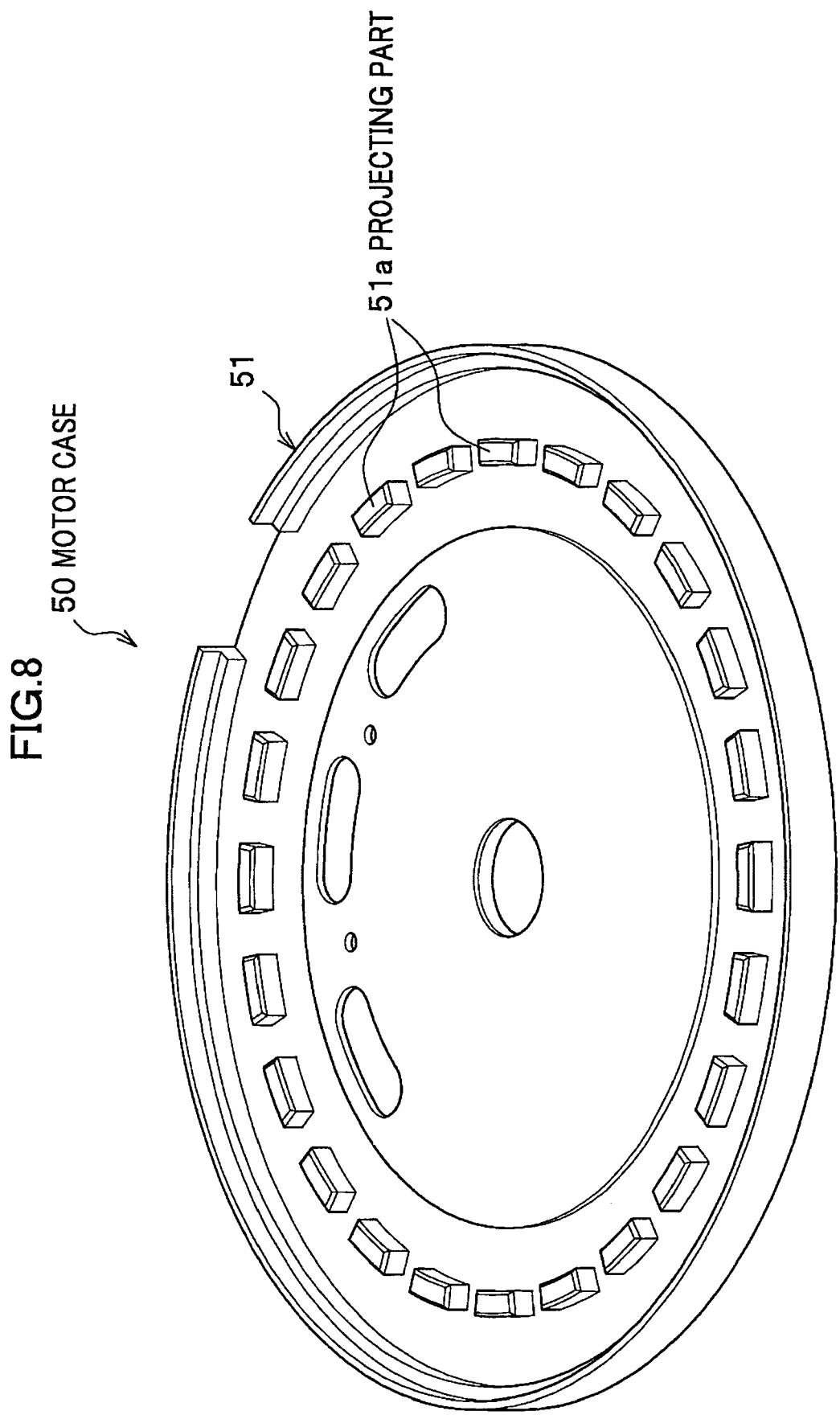
FIG. 8 is a perspective view of a cover of a motor case.
Figure 9:
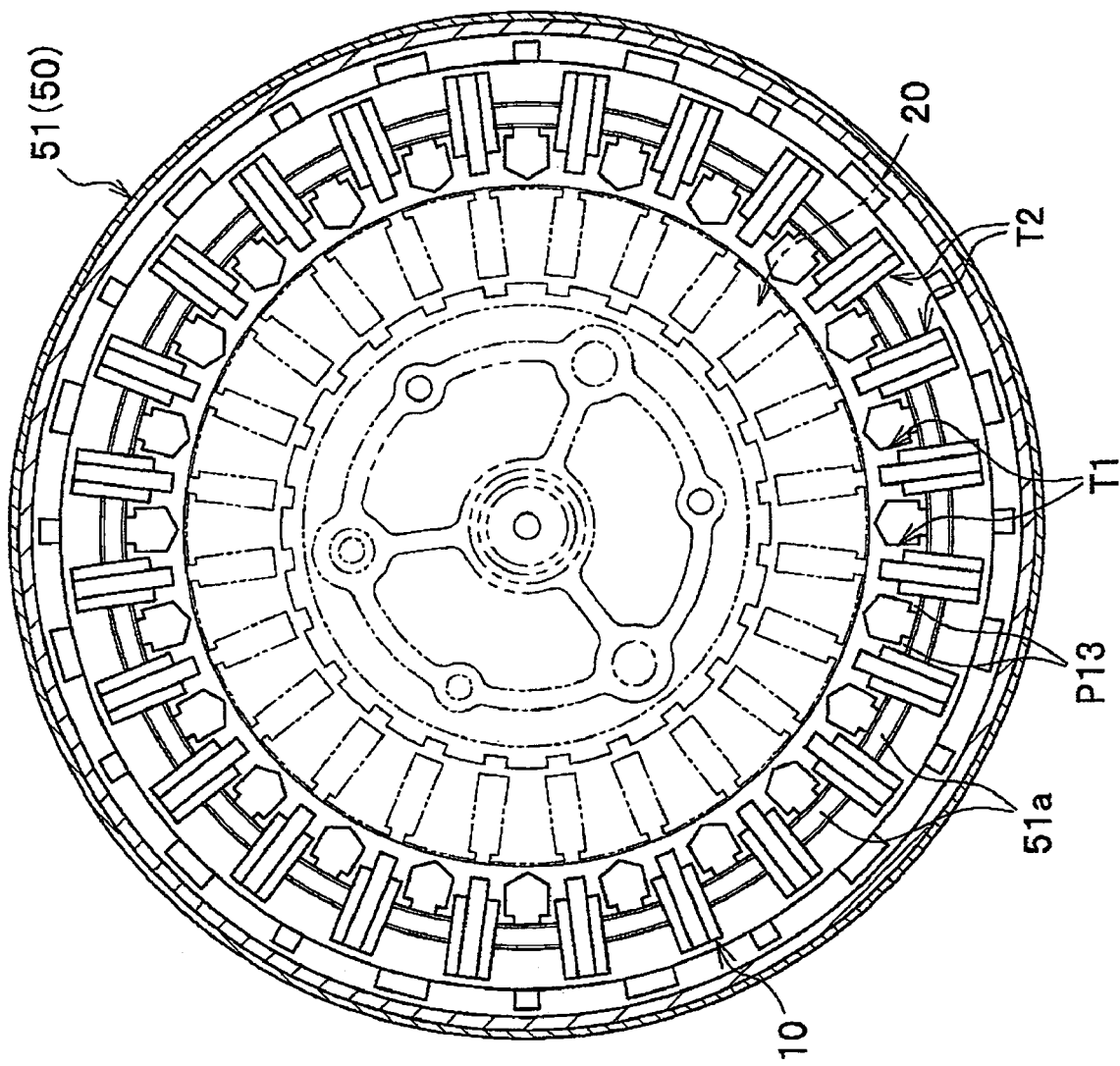
FIG. 9 is a plan view showing a relation between the first teeth and the cover.

As shown in FIG. 8, the motor case 50 mainly comprises a bottomed cylindrical housing (not shown) and a cover 51 (shown). In the cover 51, a plurality of projected parts 51a are formed at a predetermined gap in a circumferential direction. Therefore, as shown in FIG. 9, the projected part 51a engages with the contact part P13 of the first teeth T1. Accordingly, the whole teeth (units of the first teeth T1 and second teeth T2) are properly placed on an axis of the motor case.

In view of mention above, according to the first embodiment, effects can be achieved as follows:

As the coil winding part 11B is formed to be bent from the radially extending part 11A, the number of turns of an exciting coil 12 can be increased without enlarging the electric motor 1 in a radial direction, as compared with conventional teeth wherein a radially extending part and a coil winding part are placed straight in a radial direction. As the coil winding part 11B extends in an axial direction of the rotator 20, and a size of the gap between adjacent coil winding parts 11B is approximately uniform, a better value of a space factor can be maintained.

As the tip face 11a of the teeth 11 is formed to become larger in size than the outer circumferential face 23c (opposing face) of the magnetic path 23b of the rotator 20, a large amount of magnetic flux from the magnetic paths 23b can be collected by the teeth 11.

As the coil positioning projection 32a, 32b, and 42a are installed to serve as a mark in winding the exciting coil 12 on the coil winding part 11B, the exciting coil 12 can be wound in order in the coil winding part 11B, and consequently, a space factor can be improved.

As the base end parts of the plurality of teeth 11 arranged in a circle are connected with the connecting member 13, magnetic flux can move between adjacent teeth 11, and a stable magnetic path can be formed.

As the teeth 11 is constructed by being divided into the first and second teeth which are smaller than the whole teeth 11 and can be individually processed, the teeth 11 can be easily processed. Consequently, cost reduction can be realized. As the first teeth are arranged in a circle, each teeth 11 can be handled as a unit, which brings an effective assemble operation.

The connecting part C1 of the first teeth T1 and the connecting part C2 of the second teeth are comb-shaped. Accordingly, the connecting part C and C2 can be securely maintained in a fixed position even if the stator 10 vibrates due to a reactive force resulting from a magnetic influence of the rotator 20 which rotates.

As the first teeth T1 includes the contact part P13 engaging with the projected parts 51a of the motor case 50 (cover 51), the teeth as a whole (a unit of the first T1 and second teeth T2) can properly be set on the axis of the motor case 50.

As the teeth 11 can easily be manufactured by laminating steel plates (P1 to P4) of several shapes which are formed by punching out a predetermined shape from steel plates, manufacturing costs or material costs can be reduced. In addition, as compared with a general core integrally formed by sintering granular powder, the core (a unit of the first teeth T1 and second teeth T2) manufactured by laminating the plurality of steel plates (P1 to P4) has a higher magnetic permeability and allows a reduction in size and achieves a high motor torque.

As for the structure in which the speed reducer 30 is installed in a space surrounded by the coil winding parts 11B formed to be bent from the radially extending part 11A, the space formed to prevent the size of the electric motor 1 from extending in a radial direction is effectively used.

Second Embodiment

Hereinafter, a second embodiment of the present invention will be described.

Figure 10:
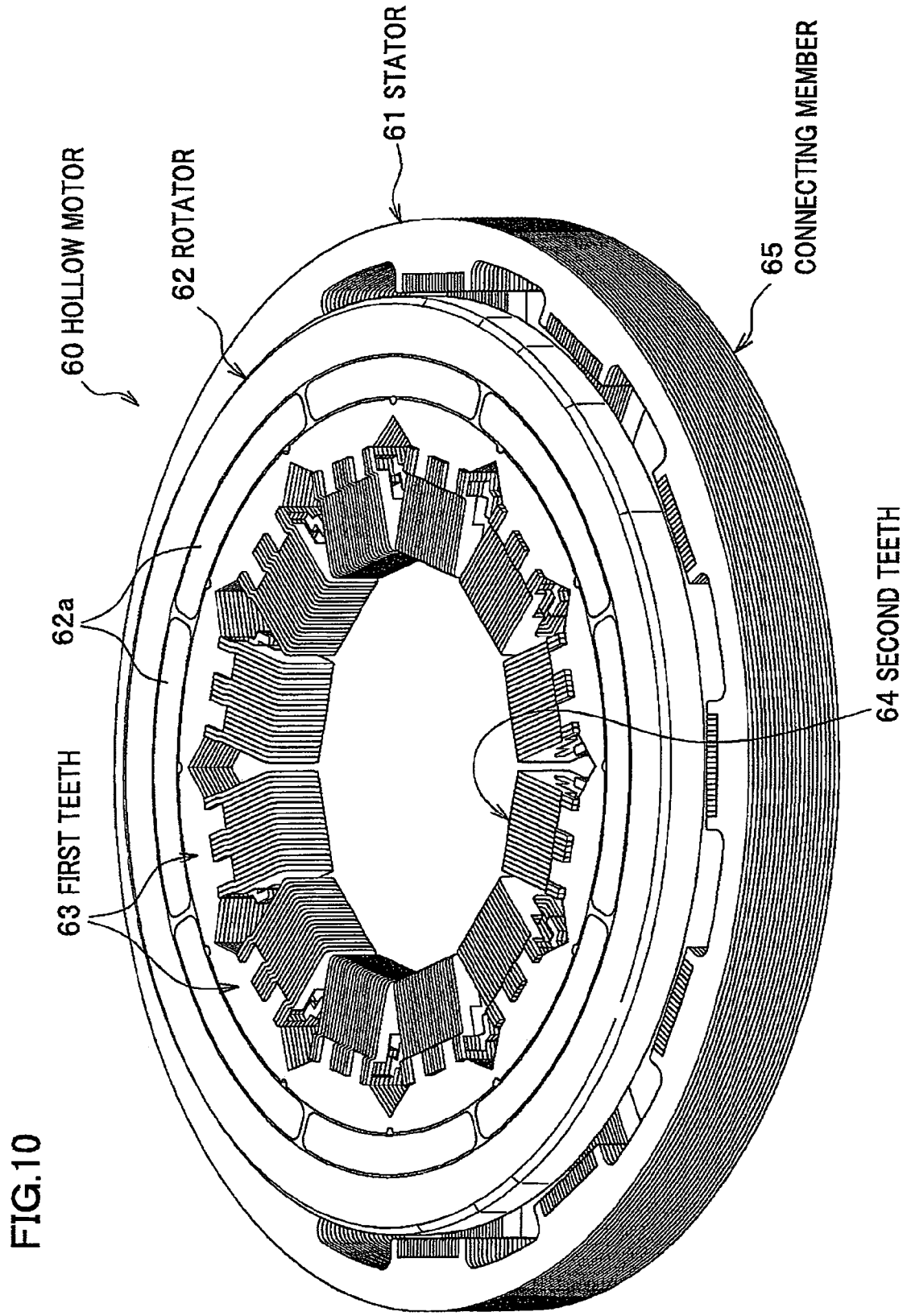
FIG. 10 is a perspective view showing a structure of a hollow motor of a second embodiment.

As shown in FIG. 10, a hollow motor 60 (electrical rotary machine) mainly comprises: a stator 61 formed in a ring shape, the tip faces of the stator are formed in a step shape; and a rotator 62 rotating relative to the stator 61. The rotator 62 includes a plurality of permanent magnets 62a on the inner circumferential side and is constructed to generate a magnetic field to a radial inward side.

The stator 61 is constructed to comprise: a plurality of first teeth 63 arranged in an inner side of the rotator 62; a plurality of approximately J-shaped second teeth 64 which support the first teeth 63 on the inner side of the rotator 62; and a connecting member 65 which supports a base end part of the second teeth 64.

Figure 11:
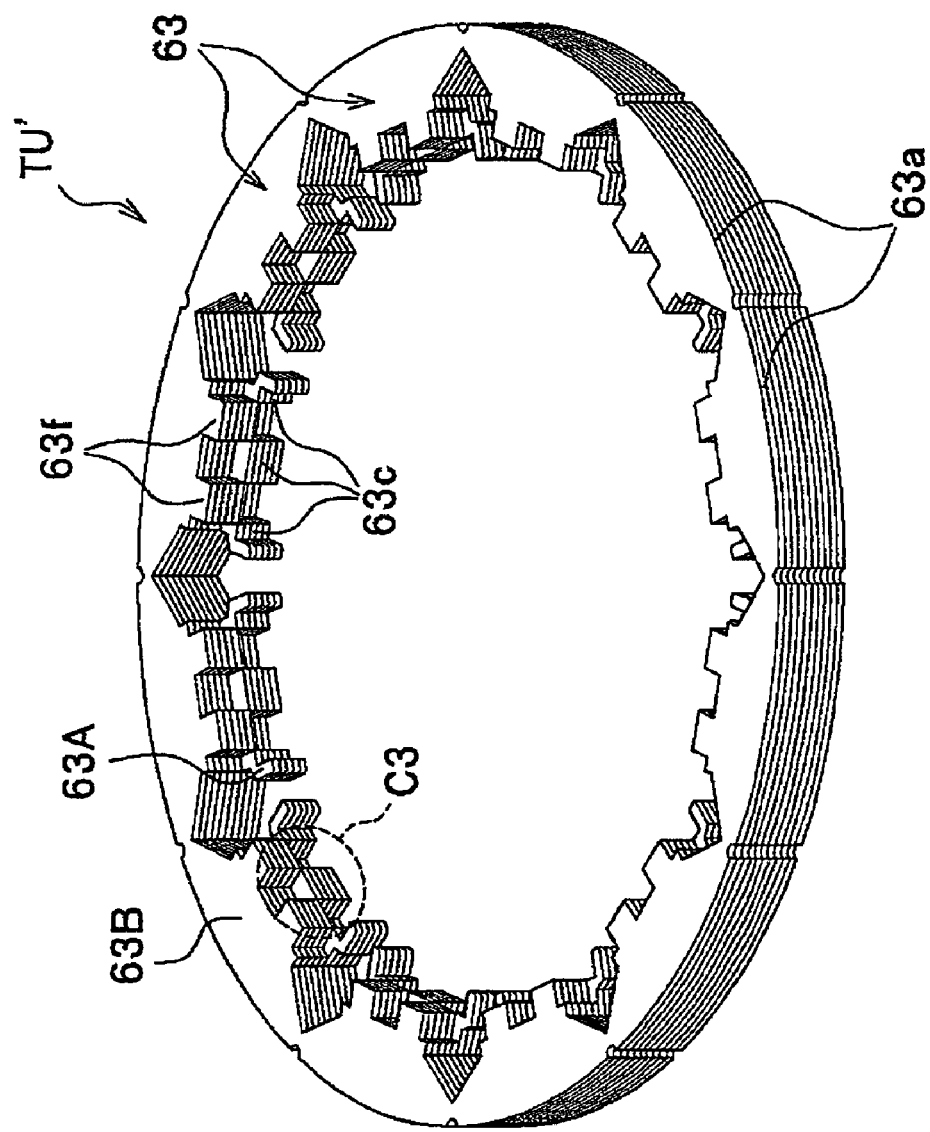
FIG. 11 is a perspective view of the first teeth.
Figure 12:
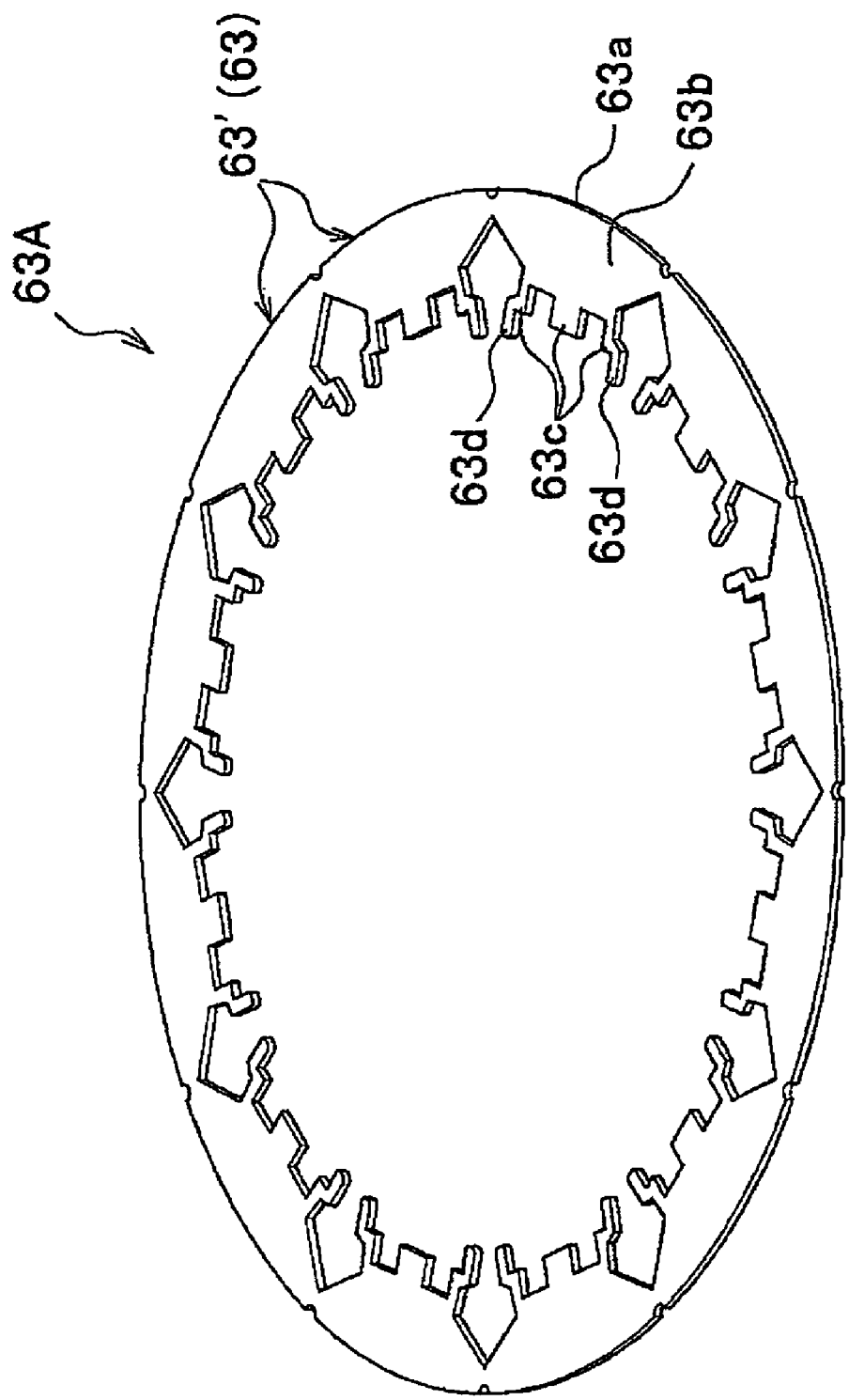
FIG. 12 is a perspective view of a first plate including the first teeth.
Figure 13:
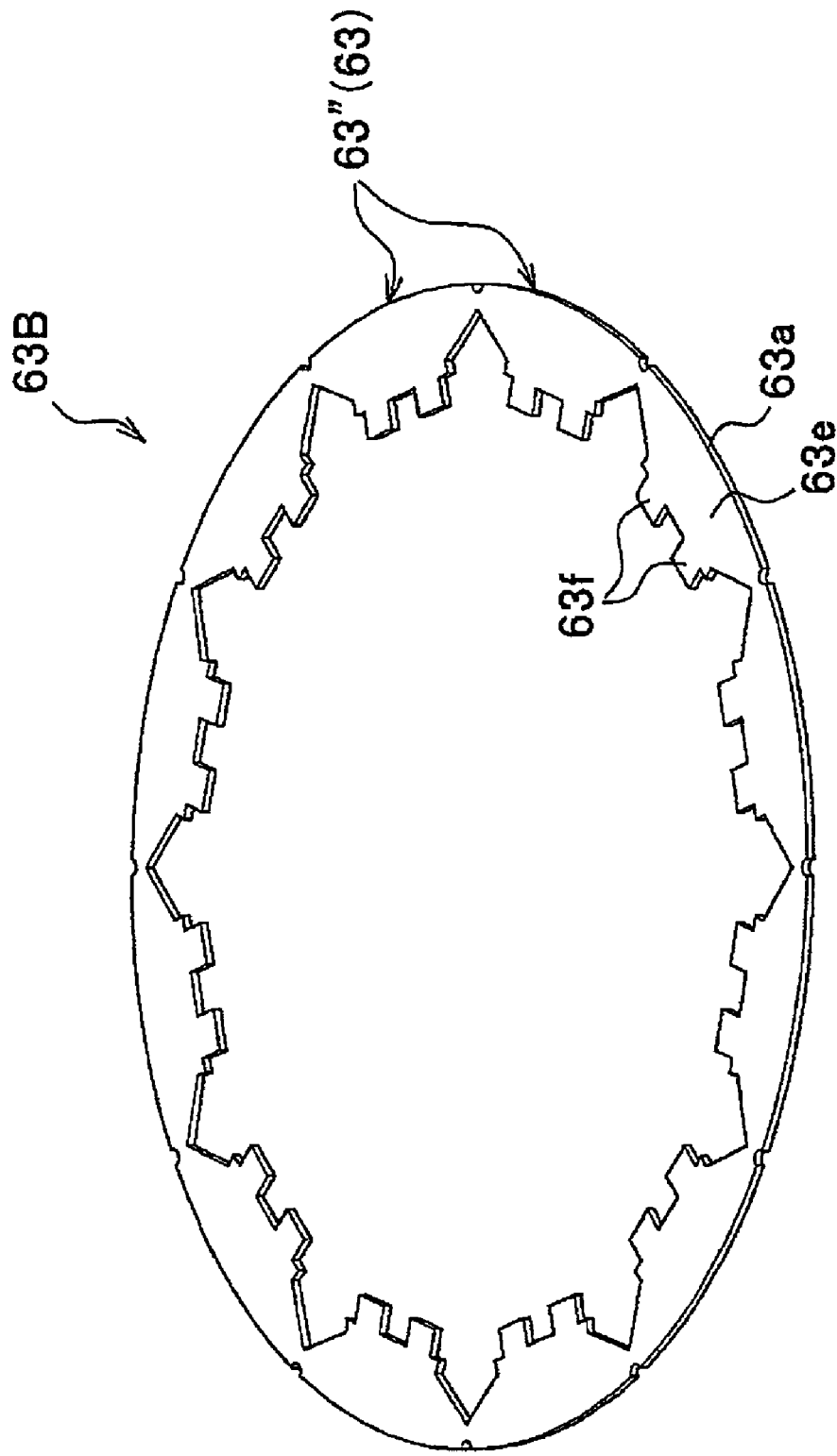
FIG. 13 is a perspective view of a second plate including the first teeth.

As shown in FIG. 11, a plurality of first teeth 63 arranged in a circle outwardly direct each tip end face 63a and are integrally formed as a first teeth unit TU' by connecting the vicinities of the tip faces 63a. As shown in FIGS. 12 and 13, the first teeth unit TU' is constructed by laminating two types of steel plates, specifically, a first plate 63A and a second plate 63B.

As shown in FIG. 12, a first plate 63A is constructed by connecting a plurality of teeth corresponding parts 63' which are arranged in a circle, the teeth corresponding part 63' corresponding to a part of the first teeth 63. The teeth corresponding part 63' comprises: a tip end part 63b including a tip face 63a; three leg parts 63c extending from the tip end part 63b in a radial inward direction; and an extended part 63d extending away from each other from the two outside leg parts P63c out of three leg parts P63c and extending in a radial inward direction.

As shown in FIG. 13, a second plate 63B, like the first plate 63A, is constructed by connecting a plurality of teeth corresponding parts 63" which are arranged in a circle, the teeth corresponding part 63" corresponding to a part of the first teeth 63. The teeth corresponding part 63" comprises a tip end part 63e including the tip face 63a and two leg parts 63f extending from the tip end part 63e in a radial inward direction. The two leg parts 63f are formed in a position to fit in with a channel formed by three leg parts 63c of the first plate 63A (refer to FIG. 11 and FIG. 12).

By laminating a predetermined number of the first plates 63A mentioned above on which a predetermined number of the second plates 63B are laminated, as shown in FIG. 11, a part on a radially inward side of the first teeth 63 is formed in a comb shape as a connecting part C3 (a form of a plurality of concave and convex parts, in other words, the leg part 63c and 63f are arranged in a zigzag state).

Figure 14:
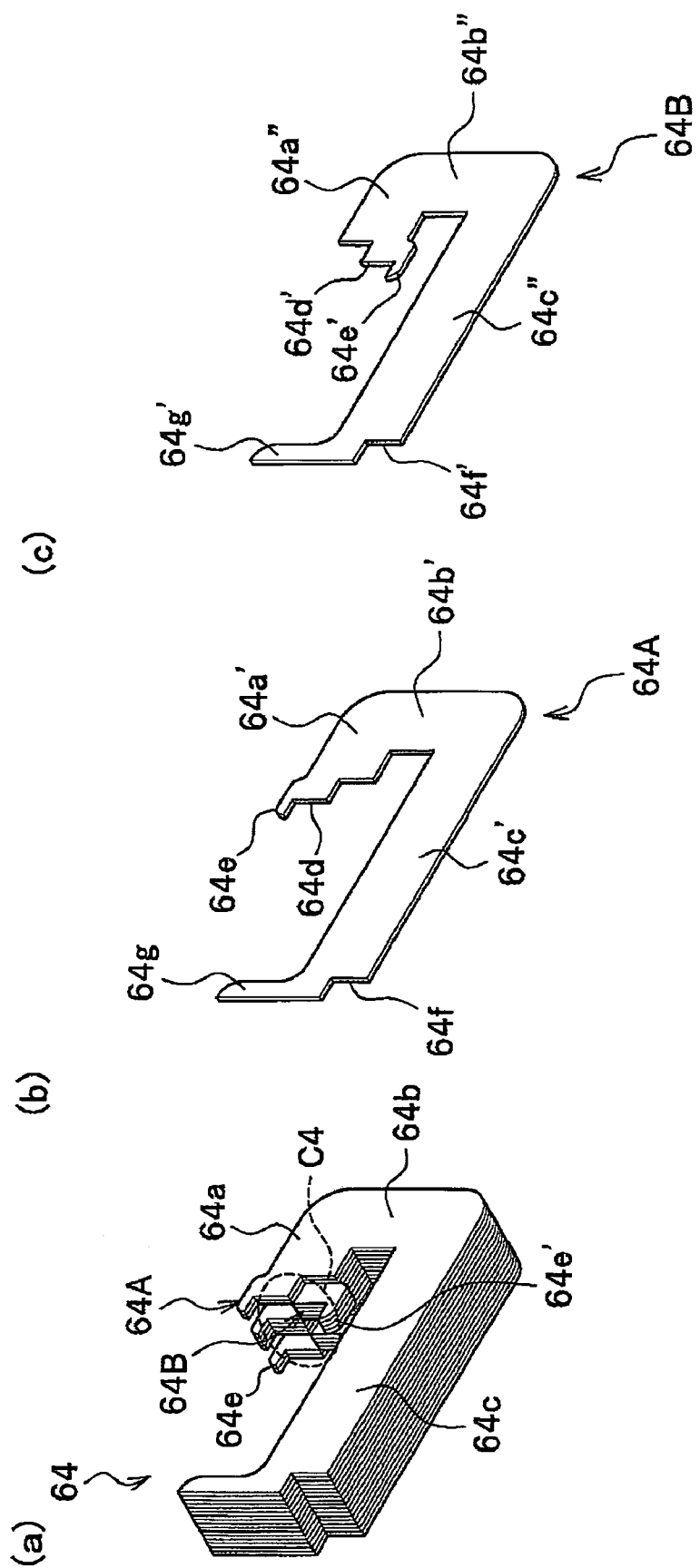
FIG. 14 includes a perspective view 14(a) of the second teeth, a perspective view 14(b) of a third plate including the second teeth, and a perspective view 14(c) of a fourth plate including the second teeth.

As shown in FIG. 14(a), the second teeth 64 is approximately J-shaped and comprises: a base part 64a (radially extending part) extending in a radial direction of the rotator 62, the base part connecting with the first teeth 63; an arm part 64b extending from the base part 64a in an axial direction of the rotator 62; and a coil winding part 64c extending from the arm part 64b in a radial outward direction. As the coil winding part 64c is longer than the radially extending part (longer than a length adding the length of the base part 64a to the length of the first teeth 63), the number of turns of the exciting coil 12 can be increased. On the other hand, in conventional teeth, a radially extending part and a coil winding part are placed straight in a radial direction. When the number of turns of the exciting coil is increased without changing a diameter of a hollow part of a hollow motor, the teeth are forced to extend in a radial outward direction. Consequently, the hollow motor becomes larger in size in a radial direction. In the hollow motor 60 of the embodiment of the present invention, as the second teeth 64 is formed to be bent in an approximately J-shape, the problem that the size of the hollow motor 60 increases in a radial direction can be solved. As shown in FIG. 14(b) and FIG. 14(c), the second teeth 64 is constructed by laminating two types of laminated steel plates, a third plate 64A and a fourth plate 64B.

As shown in FIG. 14(b), the third plate 64A is constructed to form an approximately J-shape and comprises: a base corresponding part 64a' corresponding to a part of the base part 64a; an arm corresponding part 64b' corresponding to a part of the arm part 64b; and a coil winding corresponding part 64c' corresponding to a part of the coil winding part 64c. The base corresponding part 64a' includes: a step-shaped step part 64d, whereof a tip comes closer to the arm corresponding part 64b' as the tip moves toward the coil winding corresponding part 64c'; and a claw part 64e which sets the first teeth 63, the claw part 64e on the outer side of the step part 64d (opposite side of the coil winding corresponding part 64c'). The coil winding corresponding part 64c' includes a cutout part 64f and leg part 64g which connect a connecting member 65 with a base end part of the part 64c'.

As shown in FIG. 14(c), the fourth plate 64B is constructed to form an approximately J-shape and comprises: a base corresponding part 64a'' corresponding to a part of the base part 64a; an arm corresponding part 64b'' corresponding to a part of the arm part 64b; and a coil winding corresponding part 64c'' corresponding to a part of the coil winding part 64c. The base corresponding part 64a'' includes: a step-shaped step part 64d', whereof a tip comes closer to the arm corresponding part 64b'' as the tip moves away from the coil winding corresponding part 64c''; and a claw part 64e' which sets the first teeth 63, the claw part 64e' on the inner side of the step part 64d' (side of the coil winding corresponding part 64c''). The coil winding corresponding part 64c'' includes a cutout part 64f' and leg part 64g' which connect the connecting member 65 with a base end part of the part 64c''.

A set of four third plates 64A is sandwitched between two sets of four fourth plates 64B, which are sandwhiched by two pairs of third plates 64A. As shown in FIG. 14(a), a tip of the base part 64a is formed in a comb-shape as a connecting part C4 (a form of a plurality of concave and convex parts, specifically, the step part 64d and 64d' are arranged in a zigzag state). The set of the claw parts 64e and the set of claw parts 64e' are alternately arranged in a zigzag state on both sides of the connecting part C4.

As shown in FIG. 10, the first teeth 63 and the second teeth 64 mentioned above are connected by engaging the connecting part C4 with the connecting part C3.

Figure 15:
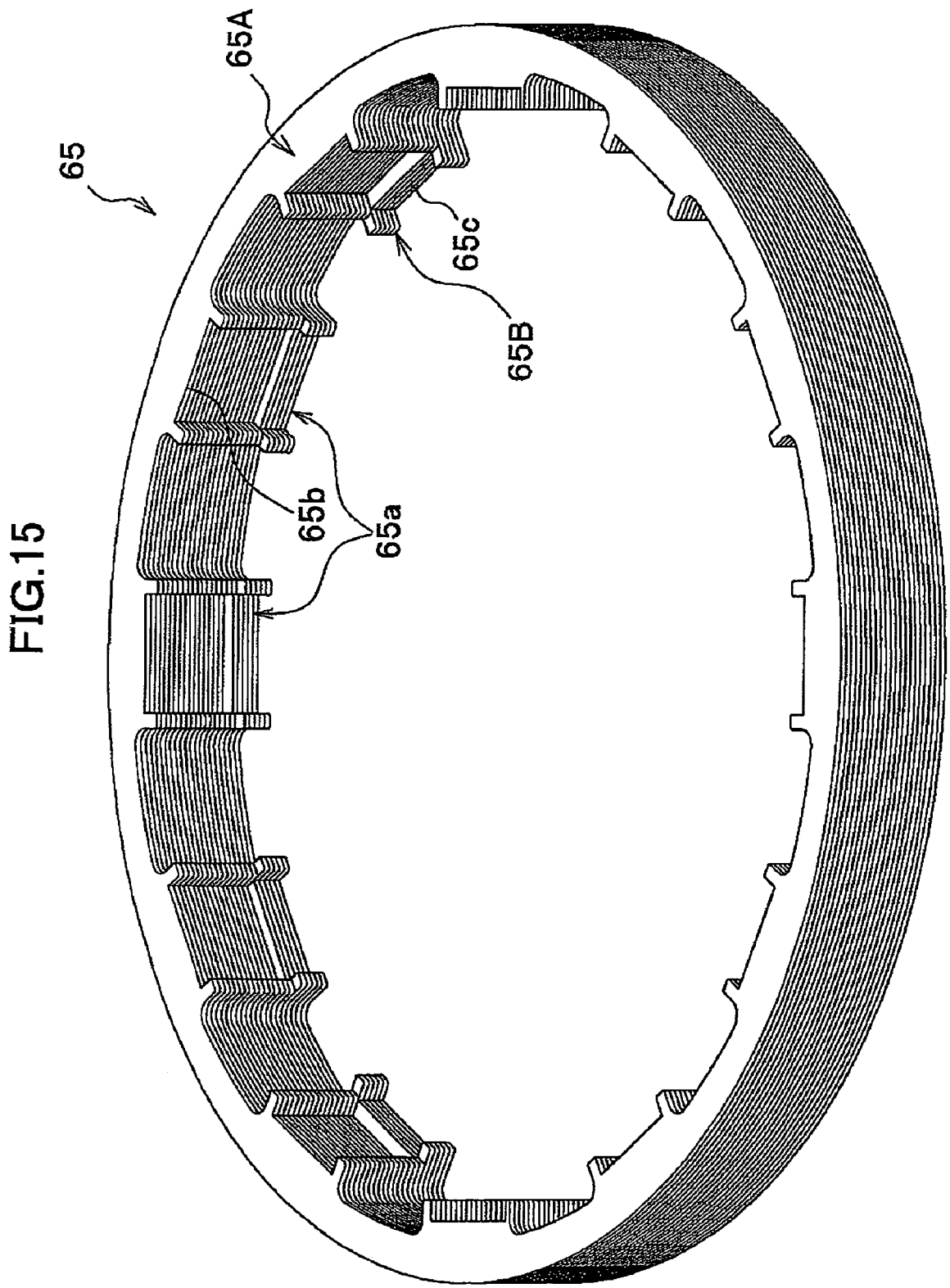
FIG. 15 is a perspective view of a structure of a connecting member.

As shown in FIG. 15, a connecting member 65 is a ring-shaped member and includes a plurality of second teeth mounting part 65a with a predetermined intervals in a circumferential direction in order to install the base end part of the second teeth 64 on an inner circumferential face of the member 65. To be specific, the connecting member 65 is formed by laminating a fifth plate 65A and a sixth plate 65B. The fifth plate 65A includes a recessed part 65b which sets the leg part 64g and 64g' of the base end part of the second teeth 64 in a laminated direction. The sixth plate 65B includes a recessed part 65c which engages with the cutout part 64f and 64f' of the base end part of the second teeth 64 and projects from the recessed part 65c on a radial inward side for the both sides of the plate 65b to be sandwitched in a laminated direction.

As mentioned above, according to the second embodiment, effects can be achieved as follows:

In conventional teeth, wherein a radially extending part and a coil winding part are placed straight in a radial direction, when the number of turns of the exciting coil is increased without changing a diameter of a hollow part of a hollow motor, the conventional teeth are forced to extend in a radial outward direction. Consequently, the hollow motor becomes larger in size in a radial direction. However, in the hollow motor 60 of the present invention, as the second teeth 64 is formed to be bent in an approximately J-shape, the number of turns of the exciting coil can be increased without enlarging the size of the motor in a radial direction.

The present invention is not limited to two embodiments as illustrated above. It is contemplated that numerous modification may be made.

In each embodiment described above, the coil winding part is formed to be bent from the radially extending part extending in a radial direction at an angle of approximately 90 or 180 degrees. The present invention is not limited to these exemplary embodiments. The coil winding part can be bent at any angle when curved teeth can increase the number of turns of a coil without enlarging the size of an electric motor (electrical rotary machine) in a radial direction.

In each embodiment described above, the electrical rotary machine includes an electric motor and a hollow motor. The present invention is not limited to these exemplary embodiments. For example, the electrical rotary machine may include an electric generator or a solenoid.

In each embodiment described above, the present invention uses the stator including the plurality of teeth, but is not limited to this. The present invention can use a rotator with structure which includes the plurality of teeth.

In each embodiment described above, the teeth are manufactured by laminating a plurality of steel plates. The present invention is not limited to these exemplary embodiments. For example, the teeth may integrally be formed by casting.

In each embodiment described above, The connecting parts between the first teeth and second teeth are comb-shaped. The present invention is not limited to these exemplary embodiments. For example, the connecting parts may be U-shaped.

In each embodiment described above, the tooth comprises two parts. The present invention is not limited to these exemplary embodiments. The teeth may integrally be formed. For example, in the first embodiment, the tip face of the radially extending part 11A is merely separate from the first teeth T1. The present invention is not limited to the exemplary embodiment. The whole of the radially extending part 11A may be separate as the first teeth T1. Further, the number of teeth or permanent magnets is not limited to the exemplary embodiment and can optionally be set.

The invention claimed is:

1. An electrical rotary machine comprising:
a rotator rotating relative to a stator,
wherein at least one of the stator and the rotator has a plurality of teeth around which exciting coils are wound,
wherein the teeth comprise a radially extending part generating a magnetic field from a tip face to the rotator or the stator and extending in a radial direction of the rotator, and a coil winding part formed to be bent from the radially extending part, and
wherein a tip end part of an axial direction of the coil winding part extending in an axial direction of the rotator is connected with a connecting member, and wherein the connecting member connects base end parts of the plurality of teeth arranged in a circle.

2. The electrical rotary machine according to claim 1, wherein:
at least the stator comprises the plurality of teeth;
the rotator comprises magnetic field generating means generating a magnetic field directed to the stator; and
the tip face of the tooth of the stator is formed to have a larger area than that of an opposing face of the magnetic field generating means of the rotator, the opposing faces opposite to the stator.

3. The electrical rotary machine according to claim 2, wherein:
a magnetic flux capture projection to capture magnetic flux which is generated by the magnetic field generating means of the rotator and proceeds in an axial direction of the rotator is installed on a tip side of the teeth of the stator.

4. The electrical rotary machine according to claim 1, wherein:
the coil winding part comprises a coil positioning projection to adjust a winding range of the exciting coil.

5. The electrical rotary machine according to claim 1, wherein:
a corner formed in a connected section between the base end part and the connecting member is formed in a curved face shape.

6. The electrical rotary machine according to claim 1, wherein:
the tooth is constructed to be divided into a first teeth comprising at least a tip face of the radially extending part and a second teeth comprising the coil winding part, the first teeth and the second teeth freely being connected to each other.

7. The electrical rotary machine according to claim 6, wherein:
a connecting part between the first teeth and the second teeth is formed to comprise a plurality of concave and convex parts which engage with one another.

8. The electrical rotary machine according to claim 6, wherein:
the first teeth comprises a tooth positioning projection which helps to set the whole of the teeth on an axis of rotation by engaging with a part of a motor case.

9. The electrical rotary machine according to claim 1, wherein:
the teeth are made by laminating a plurality of steel plates.

10. The electrical rotary machine according to claim 1, wherein:
a speed reducer is installed in a space surrounded by the coil winding parts formed to be bent from the radially extending parts, the speed reducer being on an axis of the rotator.

11. An electrical rotary machine, comprising:
a rotator rotating relative to a stator, wherein at least one of the stator and the rotator has a plurality of teeth around which exciting coils are wound, and wherein the teeth comprise a radially extending part generating a magnetic field from a tip face to the rotator or the stator and extending in a radial direction of the rotator, and a coil winding part formed to be bent from the radially extending part; and
a connecting member connecting base end parts of the plurality of teeth arranged in a circle.

12. An electrical rotary machine, comprising:
a rotator rotating relative to a stator, wherein at least one of the stator and the rotator has a plurality of teeth around which exciting coils are wound, and wherein the teeth comprise a radially extending part generating a magnetic field from a tip face to the rotator or the stator and extending in a radial direction of the rotator, and a coil winding part formed to be bent from the radially extending part; and
a speed reducer installed in a space surrounded by the coil winding parts formed to be bent from the radially extending parts, wherein the speed reducer is on an axis of the rotator.

13. The electrical rotary machine according to claim 11, wherein the coil winding part extends in an axial direction of the rotator.

14. The electrical rotary machine according to claim 12, wherein the coil winding part extends in an axial direction of the rotator.

15. The electrical rotary machine according to claim 11, wherein a tip end part of an axial direction of the coil winding part extending in an axial direction of the rotator is connected with the connecting member.

16. The electrical rotary machine according to claim 12, wherein a tip end part of an axial direction of the coil winding part extending in an axial direction of the rotator is connected with a connecting member.

* * * * *